United States Patent
Wang et al.

(10) Patent No.: US 10,200,838 B2
(45) Date of Patent: Feb. 5, 2019

(54) METHOD OF PROVIDING LOCATION INFORMATION FOR MOBILE ELECTRONIC DEVICE AND MOBILE ELECTRODE DEVICES USING THE SAME

(71) Applicant: HTC Corporation, Taoyuan (TW)

(72) Inventors: Yuan-Kang Wang, Taoyuan (TW); Wen-Chuan Lee, Taoyuan (TW); Ko-Hsin Hsiang, Taoyuan (TW); Wen-Chien Liu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 595 days.

(21) Appl. No.: 14/726,621

(22) Filed: Jun. 1, 2015

(65) Prior Publication Data
US 2015/0373085 A1 Dec. 24, 2015

Related U.S. Application Data

(60) Provisional application No. 62/014,703, filed on Jun. 20, 2014.

(51) Int. Cl.
*H04W 4/70* (2018.01)
*H04L 29/08* (2006.01)

(52) U.S. Cl.
CPC ............... *H04W 4/70* (2018.02); *H04L 67/18* (2013.01)

(58) Field of Classification Search
CPC .............................. H04L 67/18; H04W 64/08
See application file for complete search history.

(56) References Cited

U.S. PATENT DOCUMENTS 7,979,058 B2 * 7/2011 Binar ................... H04L 29/06
370/342
8,185,134 B2 5/2012 Gum et al.
(Continued)

FOREIGN PATENT DOCUMENTS

CN 1688892 10/2005
CN 101147081 3/2008
(Continued)

OTHER PUBLICATIONS

"Office Action of China Counterpart Application," dated Mar. 3, 2017, p. 1-p. 8.
(Continued)

*Primary Examiner* — Lashonda T Jacobs
(74) *Attorney, Agent, or Firm* — JCIPRNET

(57) ABSTRACT

The disclosure is directed to a method of providing location information for a mobile electronic device and a mobile electronic device using the same method. In one of the exemplary embodiments, the mobile electronic device would receive a first signal that indicates capturing a multimedia file. In response to receiving the first signal, the mobile electronic device would transmit to an external device a second signal in response to receiving the first signal. In response to transmitting the second signal, the mobile electronic device may receive from the external device a first location information or an ephemeris. The mobile electronic device may then determine the first location information either based on the first location information as received or based on the ephemeris. Also, the mobile electronic device may associate the multimedia file with the first location information.

15 Claims, 2 Drawing Sheets

(56) References Cited

U.S. PATENT DOCUMENTS

| | | | |
|---|---|---|---|
| 8,417,000 B1* | 4/2013 | Mendis | G06K 9/00671 382/118 |
| 9,860,286 B2* | 1/2018 | Kumar | H04L 65/403 |
| 2003/0149527 A1 | 8/2003 | Sikila | |
| 2004/0218895 A1* | 11/2004 | Samadani | G06F 17/30241 386/241 |
| 2005/0225643 A1* | 10/2005 | Grignani | H04N 1/21 348/207.99 |
| 2006/0217105 A1* | 9/2006 | Kumar P S | H04M 1/72541 455/404.1 |
| 2008/0133526 A1* | 6/2008 | Haitani | G06F 17/30265 |
| 2010/0066599 A1* | 3/2010 | Liu | G01S 19/05 342/357.31 |
| 2010/0097494 A1* | 4/2010 | Gum | G01S 19/14 348/231.5 |
| 2011/0115915 A1 | 5/2011 | Velusamy | |
| 2011/0256886 A1* | 10/2011 | Velusamy | G01S 5/0009 455/456.1 |
| 2012/0046050 A1* | 2/2012 | Hymel | H04W 4/028 455/456.3 |
| 2012/0315884 A1* | 12/2012 | Forutanpour | H04W 4/026 455/414.2 |
| 2013/0061147 A1* | 3/2013 | Beaurepaire | G06F 3/011 715/738 |
| 2013/0178965 A1* | 7/2013 | Baalu | H04L 67/303 700/94 |

FOREIGN PATENT DOCUMENTS

| | | |
|---|---|---|
| CN | 101437096 | 5/2009 |
| CN | 102187245 | 9/2011 |
| TW | 201005563 | 2/2010 |
| TW | 201032584 | 9/2010 |

OTHER PUBLICATIONS

"Office Action of Taiwan Counterpart Application", dated Sep. 8, 2016, p. 1-p. 6.

"Office Action of Taiwan Counterpart Application", dated Feb. 17, 2016, p. 1-p. 7.

* cited by examiner

METHOD OF PROVIDING LOCATION INFORMATION FOR MOBILE ELECTRONIC DEVICE AND MOBILE ELECTRODE DEVICES USING THE SAME

CROSS REFERENCE TO RELATED APPLICATION

This application claims the priority benefit of U.S. provisional application Ser. No. 62/014,703, filed on Jun. 20, 2014. The entirety of the above-mentioned patent application is hereby incorporated by reference herein and made a part of specification.

TECHNICAL FIELD

The disclosure is directed to a method of providing location information for a mobile electronic device and a mobile electronic device using the same method.

BACKGROUND

Currently, numerous kinds of electronic devices such as a smart phone, a tablet, a desktop computer, a laptop computer, and so forth are equipped with a camera or a camcorder to capture still or motion images. Although a file that stores a still or a motion image has information of the data and time during which the file has been created or stored, such still or motion image normally does not have location information automatically affixed to it.

A global positioning system (GPS) receiver that is a satellite based positioning system could be utilized to provide location and time related information for captured images. A GPS receiver could be used to calculate the position of a device in terms of longitudes and latitudes or in terms of a coordinate on a map from satellite signals. If an up to date ephemeris of satellite information is available to a GPS receiver, location information could be calculated from satellite signals.

However, one problem of using the GPS to obtain a location information is that satellite signals very faint typically, and location information calculated from satellite signals could be unreliable. More, in order to keep the ephemeris updated, a GPS receiver may need to download the ephemeris directly from a satellite. The download of an ephemeris could be a relatively slow process since location information could be required instantly. For example, in one scenario, a user may an immediate impulse to turn on a camera to capture a picture, but the GPS could not determine the current location of a user in time. In another scenario, a user of a camera may need to capture several pictures consecutively in a fast moving vehicle. For this scenario, the GPS receiver may also not have determined the location in time before each picture is captured. Moreover, a GPS receiver may need to finish downloading an ephemeris before being ready to provide location information.

Because of the aforementioned characteristics of the current state of a GPS receiver, an electronic device might not be able to provide a picture with accurate location information.

SUMMARY OF THE DISCLOSURE

Accordingly, the disclosure is directed to a method of providing location information for a mobile electronic device and a mobile electronic device using the same method.

In one of the exemplary embodiments, the disclosure is directed to a method of providing location information applicable to a mobile electronic device. The method would include not limited to receiving a first signal that indicates capturing a multimedia file; transmitting a second signal from an external device in response to receiving the first signal; receiving a first location information or an ephemeris from an external device in response to transmitting the second signal; determining the first location information either based on the first location information as received or based on the ephemeris; and associating the multimedia file with the first location information.

In one of the exemplary embodiment, the disclosure is directed to a mobile electronic device that includes not limited to a wireless interface and a processing unit coupled to the wireless interface. The processing unit is configured at least for receiving a first signal that indicates capturing a multimedia file; transmitting via the wireless interface a second signal to an external device in response to receiving the first signal; receiving via the wireless interface a first location information or an ephemeris from the external device in response to transmitting the second signal; determining the first location information either based on the first location information as received or based on the ephemeris; and associating the multimedia file with the first location information.

In one of the exemplary embodiment, the disclosure is directed to a non-transitory storage medium containing computer readable programs which are executed by a processing unit of a mobile electronic device to perform functions which are not limited to receiving a first signal that indicates capturing a multimedia file; transmitting a second signal to an external device in response to receiving the first signal; receiving a first location information or an ephemeris from the external device in response to transmitting the second signal; determining the first location information either as received or based on the ephemeris received; and associating the multimedia file with the first location information.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
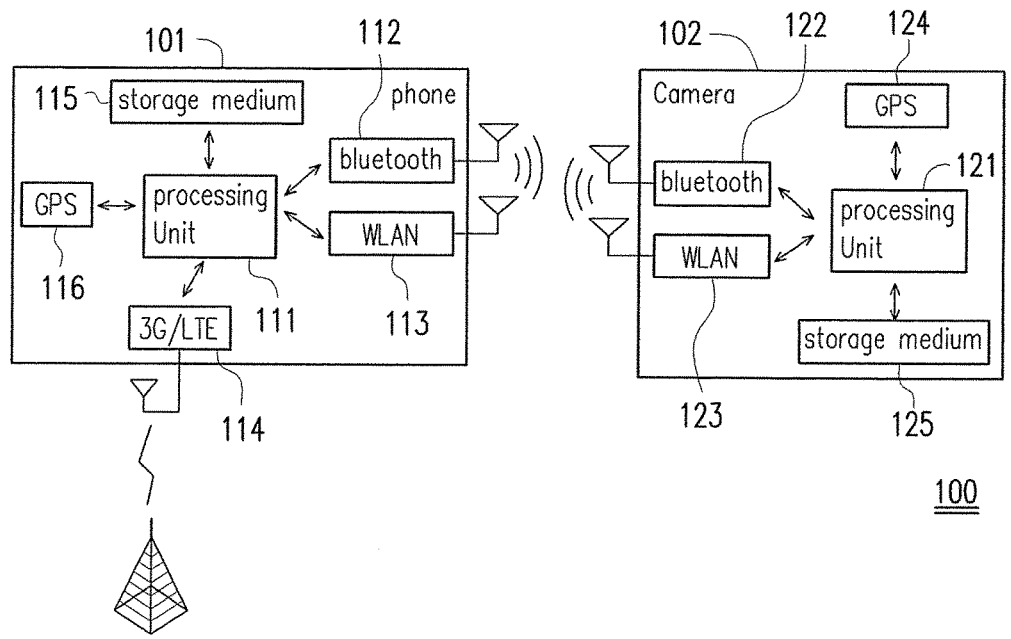
FIG. 1 illustrates an electronic system of providing location information for a mobile electronic device in accordance with one of the exemplary embodiment of the present disclosure.

Reference will now be made in detail to the present exemplary embodiments of the disclosure, examples of which are illustrated in the accompanying drawings. Wherever possible, the same reference numbers are used in the drawings and the description to refer to the same or like parts.

At the present, numerous types of electronic devices are equipped with a global positioning system (GPS) receiver that is a satellite based positioning system used to provide position and time related information for the electronic devices. A GPS receiver may calculate the position of a device in terms of longitudes and latitudes or in terms of a coordinate on a map by using satellite signals received from at least three satellites and may additionally calculate the altitude relative to the sea level of a device by using satellite signals from at least four different satellites.

One potential drawback of using the GPS is that satellite signals are not only very faint typically but could even be further attenuated under certain circumstances such as lacking a clear line of sight, being obstructed by objects, and so forth. Also, in order to obtain satellite signals of adequate strengths, an ephemeris that provides the celestial locations of satellites could be needed. However, an ephemeris may take some time to obtain as an ephemeris is typically downloaded directly from a satellite, and the transmission rate of an ephemeris download is presently only around 50 bits per second. Furthermore, an ephemeris would need to be updated every few hours as a GPS receiver is serviced by a different set of satellites every few hours.

Because of the aforementioned characteristics of the current state of a GPS receiver, an electronic device may have difficulties procuring instantaneous positioning information by relying on a GPS receiver alone. Without instantaneous positioning information, certain features of an electronic device could not be reliably implemented.

For example, one of the features of a camera proposed by the disclosure is to insert a location information into an image, a still image or an motion picture, after the image has been captured. The location information such as the name of a city could be displayed on the still image. Similarly, a location information could also be embedded into a motion image (i.e., a video) after the motion picture has been captured. However, if a still or motion image has been captured by the camera before the location of the camera is accurately discerned by the camera, the location information would not be available to be automatically incorporated into the still or motion image. This could occur if the camera has taken an image while the camera is still trying to download the ephemeris from a satellite after the previous ephemeris has been outdated. The location information could also be unavailable to be inserted into an image if the camera is unable to pinpoint the current location by using the GPS because of the weather condition or the lack of a clear sky. Moreover, under the circumstance when consecutive photographs are captured quickly by a user situated in a moving vehicle, it is possible that after one image is captured the location information could not be readied for the next image for the same reasons as mentioned. Therefore, it would be essential to be able to provide accurate location information without delay.

One solution would involve supplying location information for a camera externally from an electronic device such as a mobile phone. A smart mobile phone is typically equipped with a location providing module such as a GPS receiver and may supply location information to a camera via a peer to peer (P2P) communication interface such as a Bluetooth interface, a Wi-Fi interface, or a near field communication (NFC) interface after the current position has been calculated. A smart phone may also utilize the aforementioned P2P interface to transmit an ephemeris to the camera. If the satellite signal is unavailable or deemed unreliable, a mobile phone may make inquiries to a base station or to a cloud server via a 3G/LTE wireless interface or to a cloud server via a Wi-Fi interface to obtain either the current position or the current ephemeris. Therefore, a mobile phone may make itself available to supply such information by providing a location service access point (AP). As soon as the camera has determined that a user of the camera intends to capture a still or motion image (e.g., the user presses the shutter button), the camera would attempt to acquire necessary information to procure the location information for the still or motion image from the location service AP of the mobile phone. The camera could be configured to acquire the ephemeris on a regular basis, or the mobile phone could take the initiative to supply the ephemeris to the camera every predetermined period.

Accordingly, a camera could obtain location information from a mobile phone in at least two ways. One way is for the camera to obtain location information directly from the mobile phone. Another way is for the camera to obtain an ephemeris from the mobile phone and subsequently calculates the location information on its own accord by using the ephemeris obtained from the mobile phone.

If the camera is unable to respond to a user taking a picture on time, such as when a user takes too many picture in a short period of time or when a user takes a picture before the satellite information is available, some of the captured still or motion images may not have location information inserted in real time. However, since the camera would still be able to procure reliable location information quickly, the camera would still be able to back track by inserting location information into the captured still or motion images, and the location information would still be reliable since the user would not have moved to a far distance if the location information could be quickly procured and the location information is quickly back tracked.

By making available the location information in all or most of the captured still or motion images, additional functionalities could be implemented by either the camera or the mobile phone. Additional information could be deduced or looked up based on the location information and either be inserted into the captured still or motion image or be used by an independent application that provides certain functionalities. For example, an application could extract and map a person's traveling route based on the location information recorded in a series of captured still or motion images within a period of time. This application may also construct a map of everywhere a person has traveled.

Moreover, a set of captured still or motion images could be sorted and categorized based on the location information. By knowing the location information, an application could know whether a person is at a specific location to perform a specific activity. For example, based on the location information, an application could know whether a person is taking a light rail or taking a bus or is at work or is at a park, and so forth. The application could then gather all the captured still or motion images when the person is taking a light rail. The application may also group all the multimedia contents of the person taking a bus, working, walking in a park, and etc.

Besides obtaining location information from a GPS receiver, additional information could either be received along with the GPS signals received from satellites or be subsequently looked up from a server. For example, by knowing the time and location information, other information such as weather, temperature, atmosphere pressure, and so forth can also be looked up from a server. Other information can be used to group similar pictures into an album. For example, all the photographs or video images taken under a cloudy day in the summer time could be grouped into an album.

Various sensor readings could also be delivered from a mobile phone to a camera via a P2P transmission interface, and the sensor readings could either be embedded into multimedia contents, associated as a metadata of the multimedia contents, or be used as criteria to sort and categorize the multimedia contents. The sensor readings may include G-sensor readings, barometer readings, atmosphere pressure readings, motion sensor readings, gyroscope readings, and etc. . . . For example, based on sensor readings and location information, it could be known whether a capture still or motion image is related to a person driving at a certain location, and all these photos could be grouped into an album.

Figure 2:
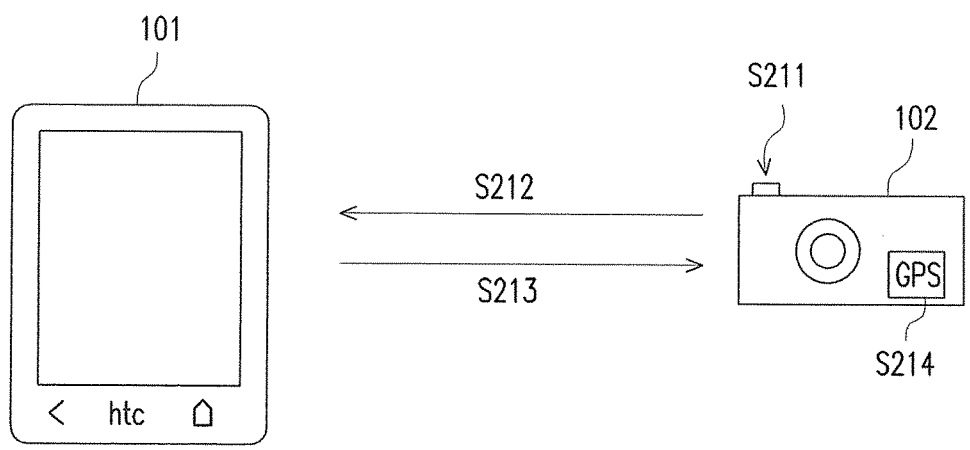
FIG. 2 illustrates a method of providing location information for a mobile electronic device in accordance with one of the exemplary embodiment of the present disclosure.

A specific embodiment for the aforementioned disclosure would be provided by FIG. 1 & FIG. 2 and their corresponding written descriptions. FIG. 1 illustrates an electronic system 100 that provides location information for a mobile electronic device in accordance with one of the exemplary embodiment of the present disclosure. The electronic system 100 may include at least but not limited to a first mobile electronic device such as a mobile phone 101 and a second mobile electronic device such as a camera 102. However, the disclosure is not limited to the specific types of mobile electronic devices as aforementioned as it is apparent for an ordinary person skilled in the art that the present disclosure could also be implemented in other types of mobile electronic devices besides a camera and a mobile phone.

The mobile phone 101 could contain at least but not limited to a processing unit 111, a Bluetooth interface 112, a WLAN interface 113, a 3G/LTE interface 114, a non-transitory storage medium 115, and a GPS module 116. The processing unit 111 is electrically connected to the Bluetooth interface 112, the WLAN interface 113, the 3G/LTE interface 114, and the storage medium 115. The Bluetooth interface 112 provides a P2P connection to an external device over another Bluetooth interface according to a version of the Bluetooth protocol families. The WLAN 113 may provide both a P2P connection according to the Wi-Fi Direct protocol and a connection to the internet through a wireless router. Both the Bluetooth interface 112 or the WLAN 113 interface may receive a signaling indication that location information or an ephemeris is needed and may in response transmit location information or ephemeris in place of the GPS receiver to the external device. A near field communication (NFC) device could also be used to substitute for the Bluetooth interface 112 and WLAN 113 interface. The 3G/LTE interface 114 allows the mobile phone to establish a connection with a base station and may obtain information from a base station such as a location information or ephemeris.

The optional non-transitory storage medium 115 of the mobile phone could be any storage device such as a random access memory (RAM), read only memory (ROM), hard disk drive, solid state disk drive, or a flash drive that provides a temporary or permanent storage. The storage medium 115 may store computer readable codes which could be loaded into a processing unit to execute the method of providing location information for a mobile electronic device.

Figure 3:
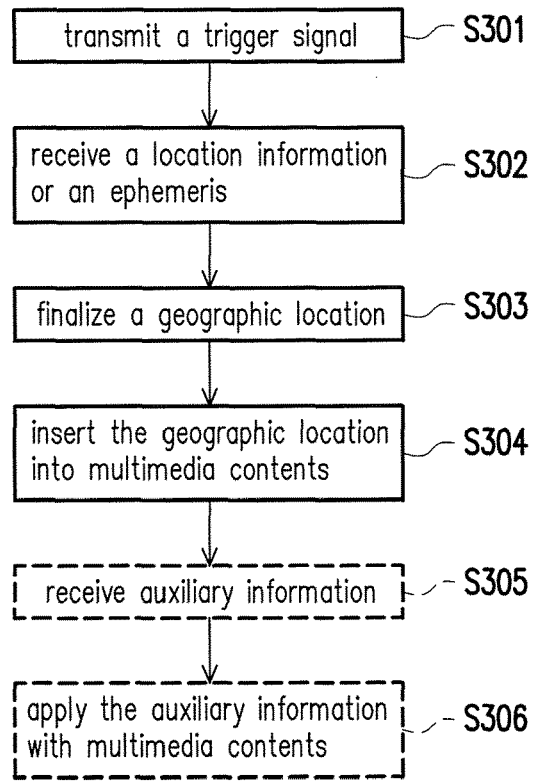
FIG. 3 is a flow chart which illustrates a process of providing location information for an electronic device from the perspective of a digital camera in accordance with one of the exemplary embodiment of the present disclosure.

The processing unit 111 may include one or more central processing units and could be electrically coupled to one or more controllers to assist in performing all or most of controlling and processing functions related to the method of providing location information applicable to a mobile electronic device such as the disclosure of FIG. 2, FIG. 3 and their corresponding written descriptions. The functions of the processing unit 111 could be implemented by using programmable units such as a micro-processor, a micro-controller, a DSP chips, FPGA, etc. The functions of the processing unit 111 may also be implemented with separate electronic devices or ICs, and the processing circuit may also be implemented with either hardware or software.

The camera 102 would include at least but not limited to a processing unit 121, a Bluetooth interface 122, a WLAN interface 123, a GPS module 124, and a non-transitory storage medium 125. The GPS module 124 includes a receiver that could be used for positioning and to download information associated with positioning such as an ephemeris. The interface Bluetooth interface 122 and the WLAN interface 123 could be used to establish a peer to peer connection with an external device such as the mobile phone 101. The interface Bluetooth interface 122 and the WLAN interface 123 could be used obtain location information and ephemeris from an external source instead of the GPS module 124.

The optional non-transitory storage medium 125 of the camera 102 could be any storage device such as a random access memory (RAM), read only memory (ROM), hard disk drive, solid state disk drive, or a flash drive that provides a temporary or permanent storage. The storage medium 125 may store computer readable codes which could be loaded into a processing unit to execute the method of providing location information for a mobile electronic device.

Figure 4:
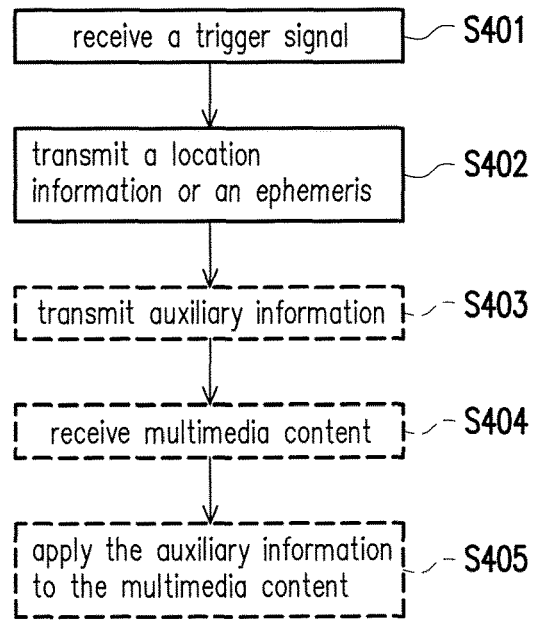
FIG. 4 is a flow chart which illustrates a process of providing location information for an electronic device from the perspective of a mobile phone in accordance with one of the exemplary embodiment of the present disclosure.

The processing unit 121 may include one or more central processing units and could be electrically coupled to one or more controllers to assist in performing all or most of controlling and processing functions related to the method of providing location information applicable to a mobile electronic device such as the disclosure of FIG. 2, FIG. 4 and their corresponding written descriptions. The functions of the processing unit 121 could be implemented by using programmable units such as a micro-processor, a micro-controller, a DSP chips, FPGA, etc. The functions of the processing unit 121 may also be implemented with separate electronic devices or ICs, and the processing circuit may also be implemented with either hardware or software.

The mobile phone 101 may optionally provide a sensor arrays (not shown) that includes a variety of sensors such as a G-sensor, a gyroscope, a proximity sensor, an altimeter, a pressure sensor, a temperature sensor, and etc. . . . The sensor readings could be transmitted to the camera 102 to be associated with multimedia contents captured by the camera 102 or could be used locally to perform the aforementioned sorting and categorizing functions.

FIG. 2 illustrates a method of providing location information for a mobile electronic device in accordance with one of the exemplary embodiment of the present disclosure. In step S211, a trigger signal could be generated in response to the processing unit 111 having determined that a user is going to capture a still or motion image. For example, a trigger signal could be generated in response to the processing unit 111 having determined that a user has pressed a shutter button of the camera 102 to capture a photograph. Similarly, a trigger signal could be generated in response to the processing unit 111 having determined that a user has pressed the start button of the camera 102 to begin capturing a video.

In step S212, the processing unit 121 of the camera 102 would determine whether the GPS module 124 could be able to capture a reliable location information which could be in terms of a longitudinal coordinate and a latitudinal coordinate or in terms of a coordinate of a map. If the GPS module 124 could capture a reliable location information, steps S213 and S214 may not be necessary as the location information will be readily embedded into captured multimedia contents or be associated with the captured multimedia contents as a metadata. If the GPS module 124 could not capture a reliable location information such as when the ephemeris is outdated or not downloaded, the trigger signal could be delivered to an external device such as a mobile phone 101 via the Bluetooth interfaces 112 122 to inquire for the location information or ephemeris.

In step S213, the processing unit 111 of the mobile phone 101 would supply to the camera 102 the location information or ephemeris if it could be reliably obtained. If such information is not available, the processing unit 111 of the mobile phone 101 may send an inquiry to a base station or to a cloud server through the base station in order to acquire the location information or ephemeris via the 3G/LTE interface 114. Alternatively, the processing unit 111 may also send an inquiry to a cloud server in order to acquire the location information or ephemeris via the WLAN interface 113. After receiving the location information or ephemeris, this information could be delivered to the camera 102 through the Bluetooth interface 112.

In step S213, the camera 102 may optionally receive auxiliary information such as time & date information, weather, temperature, atmosphere pressure, and so forth. Various sensor readings could also be delivered from the mobile phone 101 to the camera 102 via the Bluetooth interfaces 112 122 to be embedded or associated with captured multimedia contents. The sensor readings may include G-sensor readings, barometer readings, atmosphere pressure readings, motion sensor readings, gyroscope readings, and so forth.

In step S214, the processing unit 121 of the camera 102 would use the location information received from the mobile phone 101 or would calculate the location information by using the ephemeris received from the mobile 101. The processing unit 121 would take the location information and then insert into or associate with recently captured multimedia contents which are missing location information. Optionally in step S214, the processing unit 121 of the camera 102 may insert or associate the aforementioned auxiliary information with captured multimedia contents.

In one of the exemplary embodiments, if a picture is taken before a location information could be reliably determined, the camera may continue to determine or obtain the location information of the picture and retrospectively providing the picture with missing location information. For example, assuming that ten pictures have been taken by the camera 102, while the last eight pictures have location information determined and subsequently embedded in the eight pictures, the first two pictures have missing the location information because the location information for the first two pictures were not yet available. In this case, the camera may retrospectively insert location information into the first two pictures based on the latest location information, or the camera may insert an estimate of the location of the first two pictures based on the location information of the other eight pictures. The estimate of the location of the two pictures could be determined, for example, by linear extrapolation of the location information of the other eight pictures.

FIG. 3 is a flow chart which illustrates a process of providing location information for an electronic device from the perspective of a digital camera in accordance with one of the exemplary embodiment of the present disclosure. In step S301, a camera may transmit a trigger signal through a P2P wireless interface in response to the camera having determined that a capturing of a still or motion image is imminent. For example, the trigger signal could be transmitted in response to a user pressing the shutter button of the camera or pressing a start button to start capturing a video. The trigger signal is for requesting location information or an ephemeris from an external source. The external source could be a smart phone or another near electronic device. The trigger signal could be delivered via a Bluetooth interface, a NFC interface, a Wi-Fi Direct interface, or any other P2P wireless interface.

In step S302, the camera would receive a location information or an ephemeris from the P2P wireless interface. Because it may take relatively much longer time for a GPS receiver to download an ephemeris than a camera to receive the ephemeris from a mobile phone, by using a mobile phone to assist the camera to procure the ephemeris, time can be saved. Also alternatively, if a phone is not within an accessible range to the camera, the camera may simply use the last ephemeris received from the mobile phone. The location information could be under a GPS format, a longitudinal and latitudinal coordinate, or a coordinate of a map. In step S303, the camera would finalize a specific geographic information from the information received from the P2P wireless interface. For example, based on a longitudinal and a latitudinal information externally received or calculated from the received ephemeris, the camera may determine a specific name of the location, such as a city name, the name of a suburb, the Taipei train station, the Tokyo Dome, and etc. . . . The specific name of the location is to be inserted or associated with a captured multimedia file. In step S304, the camera may take the specific name of the location to insert into or to associate with captured multimedia content. In particular, the specific name could be inserted into a header or footer of a picture or video file, or the specific name could be inserted into an information field of a metadata file as the information field would contain information related to the geographic information of the picture or video.

Optionally in step S305, the camera may also receive auxiliary information as previously described. Optionally in step S306, the camera may apply the auxiliary information to the captured multimedia contents. For example, the camera may also insert or associate auxiliary information such as weather, temperature, or atmosphere pressure with captured multimedia contents.

FIG. 4 is a flow chart which illustrates a process of providing location information for an electronic device from the perspective of a mobile phone in accordance with one of the exemplary embodiment of the present disclosure. In step S401, the mobile phone may receive a trigger signal from an external source over a P2P wireless interface such as Bluetooth, Wi-Fi Direct, NFC, and so forth. The trigger signal is for requesting location information or an ephemeris. In response to receiving the trigger signal, the mobile phone may supply the requested information on its own accord or to obtain the requested information from a base station or a cloud server. In step S402, after having obtained the requested information including the location information or an ephemeris either externally or natively from a storage medium, the mobile phone would transmit the requested information back to the original source of the request via a same or different P2P wireless communication interface.

In the optional step S403, the mobile phone may transmit via a P2P wireless communication interface auxiliary information as previously mentioned. In the optional step S404, the mobile phone may receive multimedia contents externally. In the optional step S405, the mobile may apply some of the auxiliary information as previously mentioned to the multimedia contents.

For example, the mobile phone may extract a series of location information from the multimedia content to construct a person's traveling route within a period of time. This mobile phone may also construct a map of everywhere a person has traveled. The multimedia contents could also be sorted and categorized based on the location information. For example everything that occurs at a particular location could be grouped into an album. Auxiliary information could also be used to group the received multimedia contents. For example, weather information could be inserted or associated with the received multimedia contents such that everything that occurs at a particular location under a certain weather pattern could be grouped into an album. The mobile phone may additionally use sensor information that has been inserted or associated with received the multimedia contents for sorting and grouping purposes.

In one of the exemplary embodiments, the disclosure provides a method of providing location information applicable to a mobile electronic device and a mobile electronic device that would receive a first signal that indicates capturing a multimedia file, transmit a second signal to an external device in response to receiving the first signal, receive a first location information or an ephemeris from an external device in response to transmitting the second signal, determining the first location information as either as received or and associate the multimedia file with the first location information. The first signal could be an electrical trigger generated when a user presses a shutter button or a start button to capture a video. The second signal could be transmitted via a peer to peer wireless interface.

In one of the exemplary embodiments, receiving the first location information or the ephemeris in response to transmitting the second signal to the external device may include receiving the ephemeris in response to transmitting the second signal and calculating the first location information based on the ephemeris.

In one of the exemplary embodiments, the mobile electronic device may possibly capture a second multimedia file before capturing the multimedia file, wherein a second location information of the second multimedia file is not available when the second multimedia file is captured. In that event, the mobile electronic device may estimate the second location information of the second multimedia file based on the location information of the multimedia file and associate second location information of the second multimedia file with the second multimedia file.

Alternatively, the mobile electronic device may possibly capture a third multimedia file before capturing the multimedia file, wherein a third location information of the third multimedia file is not available when the third multimedia file is captured. In that event, the mobile electronic device may receive a third location information after capturing the multimedia file and associate the third location information with the third multimedia file.

Alternatively, the mobile electronic device may possibly capture a fourth multimedia file before capturing the multimedia file, wherein a fourth location information of the fourth multimedia file is not available when the fourth multimedia file is captured. In that event, the mobile electronic device may receive the ephemeris after capturing the multimedia file, determine the fourth location information based on the ephemeris, and associate the fourth location information with the fourth multimedia file.

In one of the exemplary embodiments, the mobile electronic device may receive from the external device an auxiliary information that is one or a combination of a date information, a weather information, a temperature information, and an atmosphere pressure reading; and associate the multimedia file with the auxiliary information.

In one of the exemplary embodiments, the mobile electronic device may receive a sensor reading that is one or a combination of a G-sensor reading, a barometer reading, an atmosphere pressure reading, a motion sensor reading, and a gyroscope reading and associate the multimedia file with the sensor reading.

In one of the exemplary embodiments, the mobile electronic device transmitting the second signal to the external device in response to receiving the first signal may include transmitting the second signal in response to receiving the first signal via a peer to peer (P2P) wireless interface such as Bluetooth, Wi-Fi Direct, NFC, and etc.

In view of the aforementioned descriptions, the disclosure is suitable for being used by a first mobile electronic device to supply location information for a second mobile electronic device. For example, a mobile phone would be able to utilize a 3G or LTE wireless interface to obtain and subsequently supply a location information or an ephemeris to a digital camera which would otherwise be without a suitable wireless interface or a convenient user interface to obtain the location information or the ephemeris quickly on its own.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of followed by a listing of a plurality of items and/or a plurality of categories of items, as used herein, are intended to include "any of," any combination of," "any multiple of," and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure may cover modifications and variations that are obvious to an ordinary person skilled in the art.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

What is claimed is:

1. A method of providing location information applicable to a first mobile electronic device comprising:
   receiving a plurality of first signals for capturing a plurality of multimedia files, wherein the plurality of multimedia files includes at least one first multimedia file and a plurality of second multimedia files, and the at least one first multimedia file is captured earlier than the plurality of second multimedia files;
   transmitting a second signal to a second mobile electronic device which is external to the first mobile electronic device in response to receiving the plurality of first signals;
   receiving first location information or an ephemeris from the second mobile electronic device in response to transmitting the second signal, wherein the first location information is not available when capturing the at least one first multimedia file and is available when capturing the plurality of second multimedia files;
   determining the first location information either as received or based on the ephemeris received;
   estimating second location information of the at least one first multimedia file based on the first location information; and
   associating the plurality of second multimedia files with the first location information, and associating the at least one first multimedia file with the second location information.

2. The method of claim 1, wherein receiving the first location information or the ephemeris from the second mobile electronic device in response to transmitting the second signal comprising:
   receiving the ephemeris from the second mobile electronic device in response to transmitting the second signal; and
   calculating the first location info nation based on the ephemeris.

3. The method of claim 1 further comprising:
   receiving auxiliary information from the second mobile electronic device that is one or a combination of date information, weather information, temperature information, and an atmosphere pressure reading; and
   associating the plurality of multimedia files with the auxiliary information.

4. The method of claim 1 further comprising:
   receiving a sensor reading that is one or a combination of a G-sensor reading, a barometer reading, an atmosphere pressure reading, a motion sensor reading, and a gyroscope reading; and
   associating the plurality of multimedia files with the sensor reading.

5. The method of claim 1, wherein transmitting the second signal to the second mobile electronic device in response to receiving the plurality of first signals comprising:
   transmitting the second signal to the second mobile electronic device in response to receiving the plurality of first signals via a peer to peer (P2P) wireless interface, which is one of a Bluetooth interface, a near field communication (NFC) interface, and a Wi-Fi Direct interface.

6. The method of claim 1, wherein the multimedia file is one of a still image and a video.

7. The method of claim 1, wherein receiving the plurality of first signals for capturing the plurality of multimedia files comprising:
   receiving each of the plurality of first signals in response to an activation of a shutter button or an activation of a start button to start capturing one of the plurality of multimedia files which is a video.

8. A mobile electronic device comprising:
   a wireless interface; and
   a processing unit coupled to the wireless interface, wherein the processing unit executes following steps:
   receiving a plurality of first signals for capturing a plurality of multimedia files, wherein the plurality of multimedia files includes at least one first multimedia file and a plurality of second multimedia files, and the at least one first multimedia file is captured earlier than the plurality of second multimedia files;
   transmitting via the wireless interface a second signal to an external mobile electronic device in response to receiving the plurality of first signals;
   receiving via the wireless interface first location information or an ephemeris from the external mobile electronic device in response to transmitting the second signal, wherein the first location information is not available when capturing the at least one first multimedia file and is available when capturing the plurality of second multimedia files;
   determining the first location information either as received or based on the ephemeris received from the external mobile electronic device;
   estimating second location information of the at least one first multimedia file based on the first location information; and
   associating the plurality of second multimedia files with the first location information, and associating the at least one first multimedia file with the second location information.

9. The device of claim 8, wherein the processing unit executes the step of receiving via the wireless interface the first location information or the ephemeris from the external mobile electronic device in response to transmitting the second signal comprising:
   receiving via the wireless interface the ephemeris in response to transmitting the second signal; and
   calculating the first location information based on the ephemeris.

10. The device of claim 8, wherein the processing unit further executes following steps:
    receiving over the wireless interface auxiliary information from the external mobile electronic device that is one or a combination of date information, weather information, temperature information, and an atmosphere pressure reading; and
    associating the plurality of multimedia files with the auxiliary information.

11. The device of claim 8 further comprising a sensor, and the processing unit further executes following steps:

receiving a sensor reading from one or a combination of a G-sensor, a barometer sensor, an atmosphere pressure sensor, a motion sensor, and a gyroscope sensor; and
associating the plurality of multimedia files with the sensor reading.

12. The device of claim 8, wherein the processing unit executes the step of transmitting via the wireless interface the second signal to the external mobile electronic device in response to receiving the plurality of first signals comprising:
   transmitting the second signal to the external mobile electronic device in response to receiving the plurality of first signals via the wireless interface which is a peer to peer (P2P) wireless interface, which is one of a Bluetooth interface, a near field communication interface, and a Wi-Fi Direct interface.

13. The device of claim 8, wherein the multimedia file is one of a still image and a video.

14. The device of claim 8, wherein the processing unit executes the step of receiving via the wireless interface the plurality of first signals for capturing the plurality of multimedia files comprising:
   receiving each of the plurality of first signals in response to an activation of a shutter button or an activation of a start button to start capturing one of the plurality of multimedia files which is a video.

15. A non-transitory storage medium containing computer readable programs which are executed by a processing unit of a first mobile electronic device to perform functions comprising:

receiving a plurality of first signals for capturing a plurality of multimedia files, wherein the plurality of multimedia files includes at least one first multimedia file and a plurality of second multimedia files, and the at least one first multimedia file is captured earlier than the plurality of second multimedia files;

transmitting a second signal to a second mobile electronic device which is external to the first mobile electronic device in response to receiving the plurality of first signals;

receiving first location information or an ephemeris from the second mobile electronic device in response to transmitting the second signal, wherein the first location information is not available when capturing the at least one first multimedia file and is available when capturing the plurality of second multimedia files;

determining the first location information either as received or based on the ephemeris received;

estimating second location information of the at least one first multimedia file based on the first location information; and associating the plurality of second multimedia files with the first location information, and associating the at least one first multimedia file with the second location information.

* * * * *